No. 767,043. PATENTED AUG. 9, 1904.
J. T. DICKEY & C. D. DERRY.
NON-COLLAPSIBLE TIRE.
APPLICATION FILED JUNE 9, 1903.
NO MODEL.
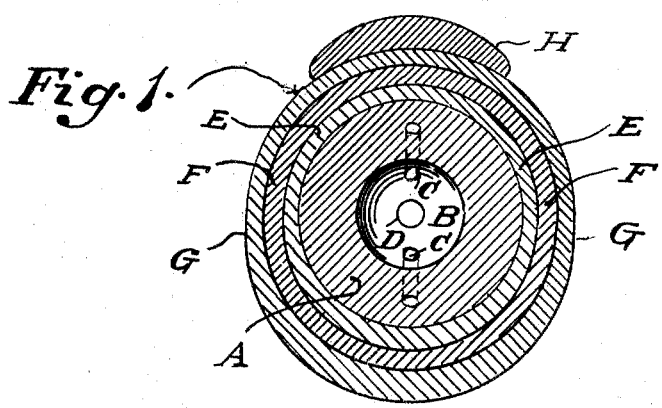
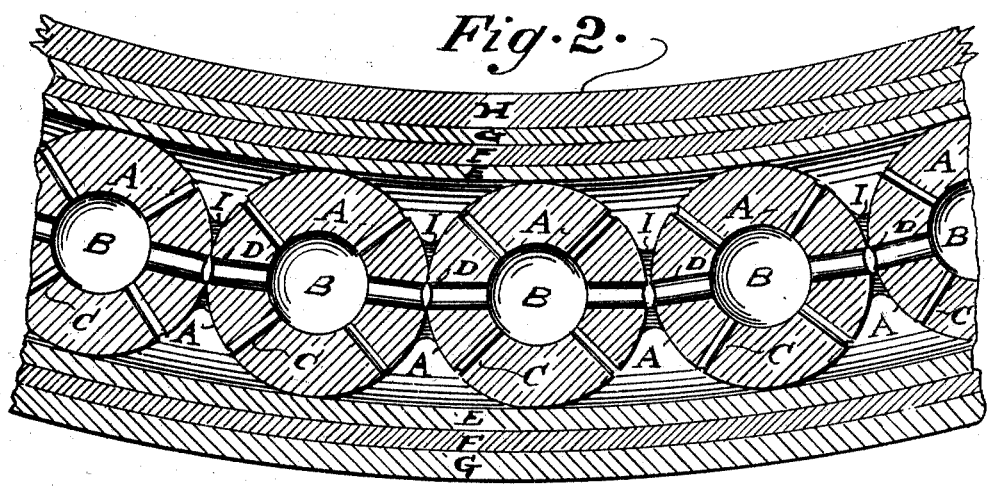
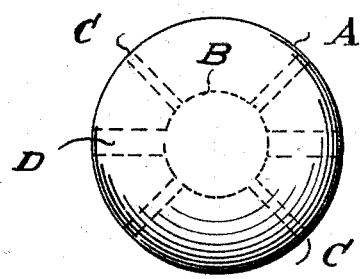
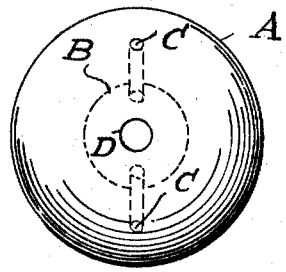
WITNESSES:
P. Anderson
A. Anderson
INVENTORS
John T. Dickey
Carry D. Derry
BY Alfred Tschirner
ATTORNEY.

No. 767,043. Patented August 9, 1904.

UNITED STATES PATENT OFFICE.

JOHN T. DICKEY AND CARRY D. DERRY, OF BARBERTON, OHIO.

NON-COLLAPSIBLE TIRE.

SPECIFICATION forming part of Letters Patent No. 767,043, dated August 9, 1904.

Application filed June 9, 1903. Serial No. 160,683. (No model.)

*To all whom it may concern:*

Be it known that we, JOHN T. DICKEY and CARRY D. DERRY, citizens of the United States, residing at Barberton, in the county of Summit and State of Ohio, have invented a new and useful Non-Collapsible Safety Automobile-Tire, of which the following is a specification.

Our invention relates to improvements in non-collapsible tires such as are used upon automobiles and like vehicles; and the object of our invention is to provide for tires of the above class a collapse-proof filling consisting of series of rubber balls provided with air-chambers and central perforations inclosed by layers of rubber and canvas. We construct said tire in such manner as to positively prevent collapsing by ordinary means and, further, cheapen and simplify its construction and in other ways render it more practical than has heretofore been done. We attain these objects by the mechanism illustrated in the accompanying drawings, in which—

Figure 1 is a cross-section of a wheel-rim having a pneumatic tire thereon constructed after the principles of our invention. Fig. 2 is a longitudinal view of a short section of a wheel-rim provided with our new pneumatic tire. Fig. 3 is a side view of a hollow rubber ball provided with circular central perforations, which constitute a part of the tire. Fig. 4 is a front view of the same.

Similar letters refer to similar parts throughout the several views.

Our invention consists, substantially, of series of rubber balls provided with air-chambers and central perforations, which practically fill out the inner space of the tire in such a manner as to fully protect the same from collapsing when punctured, at the same time affording it such resiliency as may be desirable to insure the tire readily yielding to the pressure brought to bear upon it, thus allowing the same to pass over uneven and irregular surfaces in the usual and desirable manner. We accomplish the above results in a practical manner by forming these balls A A of rubber and provide the same with a round air-chamber B and series of central perforations C and D. The perforation D may be of a larger diameter than the perforations C C, extending crosswise said ball A. These balls A A are assembled and secured together by means of rubber-cement I or vulcanized together to a solid chain in a manner shown in Fig. 2, where the circular perforations D are combined together, thus forming a continuous connection between the air-chambers of the series of balls destined to fill the hollow space of a pneumatic tire composed of layers of rubber E G and canvas F, secured around the wheel-rim H, as shown in Figs. 1 and 2.

Having thus described our invention, what we claim, and desire to secure by Letters Patent, is—

1. In a pneumatic tire, the non-collapsible filling, consisting of elastic balls, having spherical air-chambers connected by cylindrical perforations, forming one continuous air-chamber, a series of cylindrical perforations extending crosswise from said chamber, connecting with an outer air-chamber, formed by the balls and the covering material, all substantially as set forth.

2. In a pneumatic tire, the non-collapsible filling, consisting of elastic balls, provided with spherical air-chambers, connected by perforations, forming a continuous air-chamber— crosswise-extending perforations, connecting with an outer air-chamber, formed by the balls and the covering material, consisting of layers of rubber and canvas, substantially as described.

In testimony whereof we have signed our names to this specification, in the presence of two subscribing witnesses, at Barberton, in the county of Summit and State of Ohio, the 29th day of May, 1903.

JOHN T. DICKEY.
CARRY D. DERRY.

Witnesses:
P. ANDERSON,
A. ANDERSON.